United States Patent
Cornet et al.

(10) Patent No.: US 10,683,863 B2
(45) Date of Patent: Jun. 16, 2020

(54) INTERNAL GEAR PUMP

(71) Applicant: Safran Aero Boosters S.A., Herstal (Milmort) (BE)

(72) Inventors: Albert Cornet, Verviers (BE); Mathieu Chenoux, Arlon (BE)

(73) Assignee: Safran Aero Boosters S.A., Herstal (Milmort) (BE)

( * ) Notice: Subject to any disclaimer, the term of this patent is extended or adjusted under 35 U.S.C. 154(b) by 322 days.

(21) Appl. No.: 15/635,057

(22) Filed: Jun. 27, 2017

(65) Prior Publication Data

US 2018/0003173 A1 Jan. 4, 2018

(30) Foreign Application Priority Data

Jun. 29, 2016 (BE) .................................. 2016/5502

(51) Int. Cl.
| | |
|---|---|
| *F04C 2/10* | (2006.01) |
| *F01D 15/08* | (2006.01) |
| *F04C 2/08* | (2006.01) |
| *F04C 15/00* | (2006.01) |
| *F04C 15/06* | (2006.01) |
| *B64D 27/10* | (2006.01) |

(52) U.S. Cl.
CPC .............. *F04C 2/102* (2013.01); *F01D 15/08* (2013.01); *F04C 2/084* (2013.01); *F04C 2/086* (2013.01); *F04C 15/0042* (2013.01); *F04C 15/06* (2013.01); *B64D 27/10* (2013.01); *F04C 2210/14* (2013.01); *F04C 2210/206* (2013.01); *F05D 2220/323* (2013.01); *F05D 2260/98* (2013.01)

(58) Field of Classification Search
CPC .......... F04C 2/102; F04C 2/084; F04C 2/086; F04C 15/0042; F04C 15/06; F04C 18/08
See application file for complete search history.

(56) References Cited

U.S. PATENT DOCUMENTS

| | | | | |
|---|---|---|---|---|
| 3,851,998 A | * | 12/1974 | Downing | ............... F02M 59/12 |
| | | | | 417/199.2 |
| 6,270,169 B1 | | 8/2001 | Harada et al. | |
| 2002/0122736 A1 | | 9/2002 | Takagi | |
| 2006/0029509 A1 | | 2/2006 | Kurata et al. | |

FOREIGN PATENT DOCUMENTS

| | | | | |
|---|---|---|---|---|
| DE | 19820565 A1 | * | 1/1999 | .............. F04C 2/102 |
| DE | 198 14 545 A1 | | 10/1999 | |

OTHER PUBLICATIONS

English translation of DE19820565 by Espacenet Oct. 29, 2019.*
Belgian Search Report and Written Opinion completed Jul. 30, 2016, issued in corresponding Belgian Application No. 2016/5502, filed Jun. 29, 2016, 12 pages.

* cited by examiner

*Primary Examiner* — Deming Wan
(74) *Attorney, Agent, or Firm* — Christensen O'Connor Johnson Kindness PLLC

(57) ABSTRACT

An internal gear pump includes a pinion, a ring arranged around the pinion, and a cylindrical wall arranged around the ring. A support element, on which the pinion and the ring are supported, carries high-pressure liquid towards a recess located at the junction between the ring and the cylindrical wall, and also carries low-pressure liquid towards another recess located at another point of the junction between the ring and the cylindrical wall. The recess allows the load of the ring on the cylindrical wall to be reduced.

9 Claims, 7 Drawing Sheets

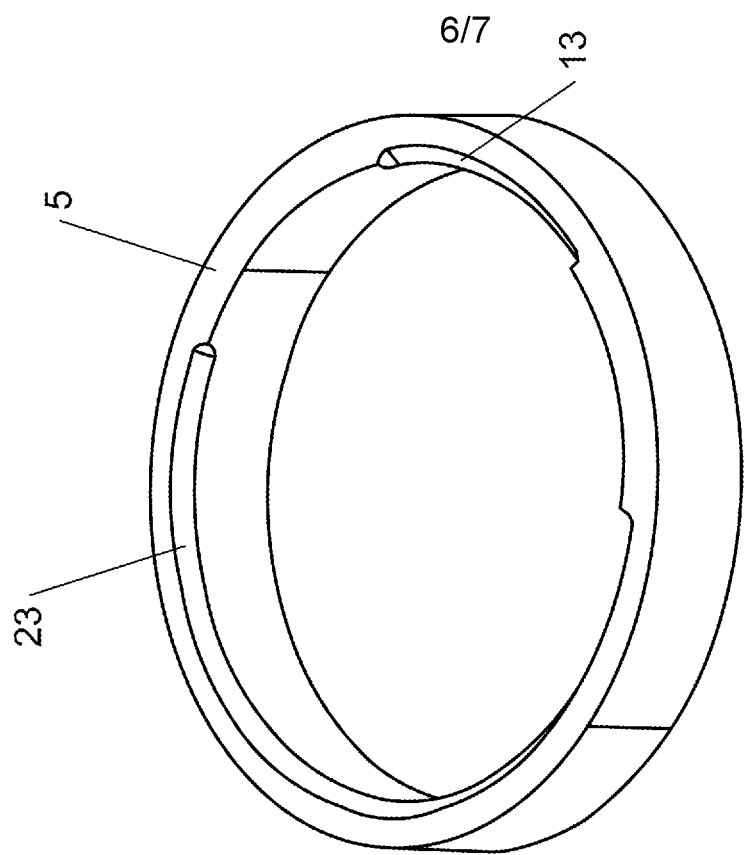
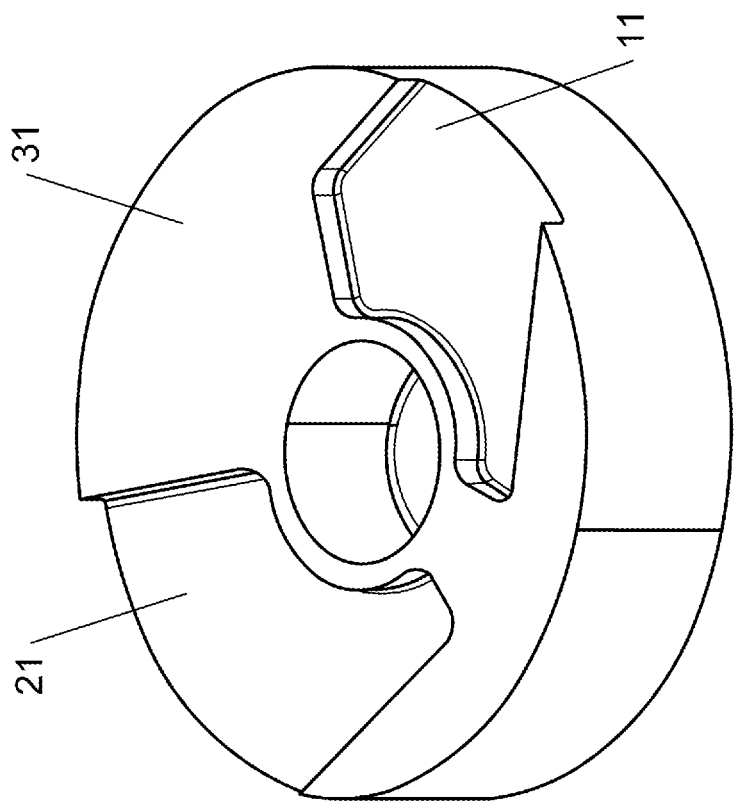
Fig. 7b
Fig. 7a

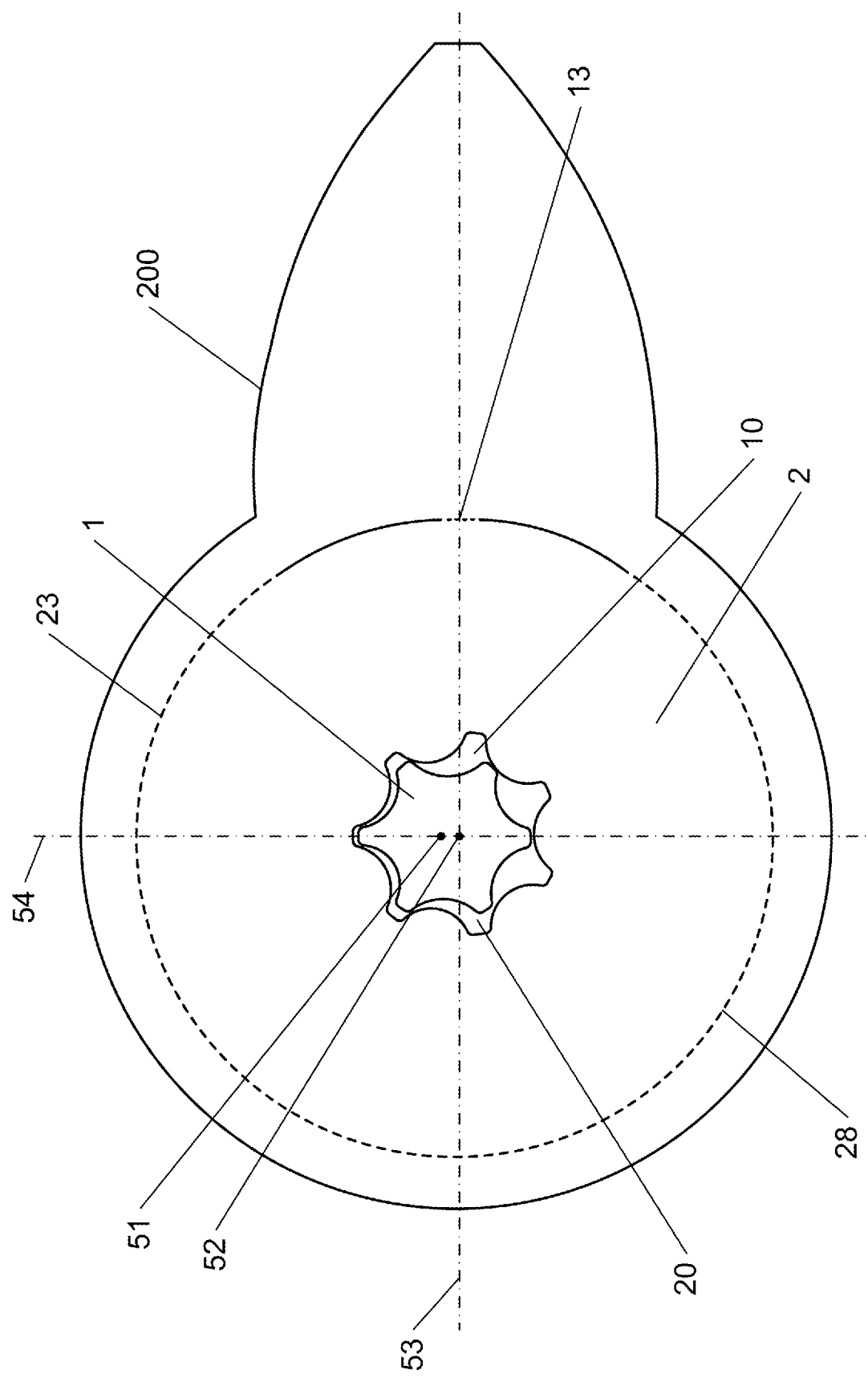

INTERNAL GEAR PUMP

TECHNICAL FIELD

The present disclosure relates to an internal gear pump that can be used in an aircraft turbine engine.

BACKGROUND

DE102011100105 discloses an internal gear pump comprising a pinion and a ring. The ring is arranged in a bore of a housing. A low-pressure space and a high-pressure space are located between the ring and the pinion. The high-pressure space is in fluid communication with a first pressure chamber forming a first angular extension of the bore of the housing on an outer peripheral surface of the ring. The purpose of the first pressure chamber is to modify the pressure field in the pump in order to reduce the clearance between the pinion teeth and the ring teeth in their contact region.

The first pressure chamber is arranged on slightly less than a quarter of the circumference of the ring. According to this document, placing the first pressure chamber so that it is radially adjacent to the low-pressure space allows the clearance between the pinion teeth and the ring teeth to be reduced.

One problem of the known internal gear pump is that the pressure field in the ring resulting from pressure differences causes a radial thrust from the ring towards the internal wall of the bore of the housing. Indeed, the pressure field pushes the ring towards the pinion in their contact region and thus also pushes the ring towards the internal wall of the bore in the radial extension of this contact region. This radial thrust causes friction and accelerated wear of the internal wall of the bore of the housing.

SUMMARY

One object of the disclosed subject matter is to provide a gear pump, in which the friction between the ring and the element that radially supports the ring is reduced. For this purpose, one representative embodiment of the disclosed internal gear pump comprises:
 a pinion capable of rotating about a first axis of rotation;
 a ring arranged around the pinion, having a cylindrical periphery and being capable of rotating about a second axis of rotation that is different to the first axis of rotation and parallel thereto, the pinion and the ring being arranged so as to delimit a work space comprising a high-pressure space and a low-pressure space;
 a first support element arranged on a first side of the ring to limit the movement thereof in a first sense in a first orientation that is substantially parallel to the first and second axes of rotation;
 a second support element arranged on a second side of the ring to limit the movement thereof in a second sense that is opposite the first sense and in the first orientation;
 a cylindrical wall arranged around the ring to limit the movement thereof in a plane that is substantially perpendicular to the second axis of rotation;
 a first high-pressure recess in an arc of a circle and in fluid contact with a first portion of the cylindrical periphery of the ring;
 a first low-pressure recess in an arc of a circle and in fluid contact with a second portion of the cylindrical periphery of the ring, the first high-pressure recess and the first low-pressure recess being separated;
 a first high-pressure conveying means forming a fluid connection between the high-pressure space and the first high-pressure recess; and
 a first low-pressure conveying means forming a fluid connection between the low-pressure space and the first low-pressure recess, characterised in that
 the first high-pressure recess is symmetrical to a second plane passing through the second axis of rotation and perpendicular to a first plane passing through the first and second axes of rotation, and in that
 the first low-pressure recess is symmetrical to said second plane.

The low-pressure space is the portion of the work space in which the liquid initially enters. The liquid is then compressed and pushed by the pinion and the ring towards the high-pressure space. The liquid then exits the work space at a greater pressure than when it entered the work space. It is also possible for the liquid to enter the pump via the high-pressure space and to exit via the low-pressure space.

The first plane, which is defined as the plane passing through the axes of rotation of the pinion ring, passes through the contact region between the ring and the pinion. The side of the first plane in which the ring and the pinion move away from each other comprises the low-pressure space and the side of the first plane in which the ring and the pinion move towards each other comprises the high-pressure space.

The liquid in the high-pressure space exerts a first internal radial thrust on the ring. The liquid in the low-pressure space exerts a second internal radial thrust on the ring, opposite the first radial thrust. The ring thus experiences an overall radial thrust resulting from the difference between these thrusts, which pushes it towards the cylindrical wall in an orientation that is perpendicular to the first plane.

The present disclosure allows a thrust to be created in the other orientation in order to counteract the thrust of the ring due to the high-pressure and low-pressure spaces. In the present disclosure, the liquid that is present between the ring and the pinion is carried to the periphery of the ring by conveying means, then the liquid spreads into the recesses in an arc of a circle. The liquid also preferably spreads between the ring and the cylindrical wall. A radial force is generated locally by each liquid element present in the recesses. By using recesses that are symmetrical to the second plane, the present disclosure allows the components of the forces generated by the liquid elements of the recesses that are parallel to the first plane to be cancelled out. Only the components that are perpendicular to the first plane remain, which allows the thrust in the ring due to the high-pressure and low-pressure spaces to be counterbalanced, at least in part.

The recesses allow regions to be created in an arc of a circle, in which regions the pressure on the cylindrical wall is constant.

Furthermore, the inward radial pressure generated by each liquid element of the recesses on the ring moves the ring away from the cylindrical wall, thus reducing the friction of the ring against the cylindrical wall.

Furthermore, if the liquid circulating in the pump is a lubricant, carrying said lubricant between the ring and the cylindrical wall further reduces the friction between the ring and the cylindrical wall.

The internal gear pump according to the present disclosure can be a gerotor, for example.

The cylindrical wall arranged around the ring can be referred to as a ring bearing.

The pinion comprises teeth on an outer surface. The ring comprises teeth on an inner surface.

The first axis of rotation, i.e. the axis of rotation of the pinion, is preferably the symmetry axis of a circumscribed circle of the pinion. The second axis of rotation, i.e. the axis of rotation of the ring, is preferably the symmetry axis of the cylindrical periphery of the ring.

The first (or second) support element adjoins the pinion and the ring, in the sense that there is no solid element between them. There can be liquid between them. The first and second support elements can be called first and second flanges. The first and second support elements or their reservoirs delimit the work space in the orientation parallel to the first and second axes.

The first and second sides of the ring can be visualised by considering that they are separated by a third plane, perpendicular to the first and second planes and passing through the centre of the ring, this centre being taken in the first orientation. The second side of the ring is opposite the first side of the ring.

Within the scope of this document, a "low-pressure" element is an element intended to receive a low-pressure fluid, i.e. a fluid before it is compressed by the pump or at the start of its phase of compression by the pump. A "low-pressure" element also can be denoted element "for fluid pre-compression" or a "first", "second", "third" or "fourth" element.

In the context of this document, a "high-pressure" element is an element intended to receive a high-pressure fluid, i.e. a fluid after it has been compressed by the pump or at the end of its phase of compression by the pump. A "high-pressure" element also can be referred to as an element "for fluid post-compression", or a "first", "second", "third" or "fourth" element.

The cylindrical wall is a radial support element of the ring. It is preferably a radial bearing of the ring, for example a plain bearing. It allows the movement of the ring in any orientation that is perpendicular to the second axis of rotation to be limited.

The first high-pressure recess and the first low-pressure recess each form an arc of a circle, which circle has a radius close to the radius of the periphery of the ring. Preferably, the recesses are shallow. Preferably, the depth of the recesses is less than a quarter of the height of the element from which they are hollowed out.

The fluid contact between the recesses and the cylindrical periphery of the ring is preferably a fluid contact between the recesses and the edge of the first side or the edge of the second side of the cylindrical periphery of the ring. At the start of this edge, the clearance between the cylindrical periphery of the ring and the cylindrical wall allows the fluid present in the recess to spread between the cylindrical periphery of the ring and the cylindrical wall.

The symmetry of the first high-pressure (or low-pressure) recess relative to the second plane is an orthogonal symmetry relative to this plane. In other words, the first high-pressure (or low-pressure) recess is its own mirror image in the second plane.

The pump is preferably intended to pump a liquid, more preferably a lubricant, even more preferably oil.

The pump can be used in an aircraft, for example.

Preferably, the first low-pressure recess has a greater angular extension than the first high-pressure recess.

The angular extension is the angle of an arc of a circle taken relative to the second axis of rotation. The inventors have found that a design of this kind is particularly advantageous for reducing friction between the ring and the cylindrical wall.

Preferably, the angular extension of the first low-pressure recess is greater than 90°, preferably greater than 180°.

As the pressure of the liquid elements moves the ring away from the cylindrical wall and as this liquid allows lubrication, it is advantageous for the recesses to have a large angular extension.

Preferably, the first high-pressure recess is at least partially, preferably entirely, on the same side of the first plane as the high-pressure space, and the first low-pressure recess is at least partially on the same side of the first plane as the low-pressure space.

Consequently, the first low-pressure recess is at least partially on the other side of the first plane with respect to the first high-pressure recess. The fluid junction between the first high-pressure conveying means and the first high-pressure recess is preferably on the same side of the first plane as the high-pressure space. The fluid junction between the first low-pressure conveying means and the first low-pressure recess is preferably on the same side of the first plane as the low-pressure space. Such a geometry simplifies the fluid connection between the high-pressure space and the high-pressure recess and the fluid connection between the low-pressure space and the low-pressure recess.

Preferably, the first high-pressure conveying means comprises a first high-pressure reservoir in the first support element, and the first low-pressure conveying means comprises a first low-pressure reservoir in the first support element.

The first reservoirs are cavities in the first support element.

Preferably, the first high-pressure reservoir comprises a portion passing through the first support element and forming part of a duct for discharging liquid from the pump and the first low-pressure reservoir comprises a portion passing through the first support element and forming part of a duct for introducing liquid into the pump.

Preferably, the liquid inlets and outlets are provided in parallel with the first and second axes.

Preferably, the first high-pressure conveying means comprises a first high-pressure radial groove in the first support element forming a fluid connection between the first high-pressure reservoir and the first high-pressure recess, and the first low-pressure conveying means comprises a first low-pressure radial groove in the first support element forming a fluid connection between the first low-pressure reservoir and the first low-pressure recess.

The first high-pressure (or low-pressure) radial groove allows a direct path between the first high-pressure (or low-pressure) reservoir, which is in direct contact with the high-pressure (or low-pressure) space and the first high-pressure (or low-pressure) recess. Furthermore, the radial grooves are easy to machine. The first high-pressure radial groove is preferably in the extension of the first low-pressure radial groove. The radial grooves are preferably in the second plane. This means that they directly carry the liquid to the central points of the recesses, since these are symmetrical to the second plane. This design provides a pump that is particularly well balanced and easy to manufacture.

Preferably, the first high-pressure reservoir extends as far as the first high-pressure recess, and the first low-pressure reservoir extends as far as the first low-pressure recess.

Preferably, the liquid inlets and outlets are provided so as to be perpendicular to the first and second axes, the reservoirs forming radial inlets and outlets. The liquid then preferably enters the first low-pressure recess before filling the low-pressure space.

Preferably, the first recesses comprise recesses in the first support element.

This allows recesses having a large angular extension to be provided, without reducing the radial support surface of the ring as the recesses are axially offset relative to the ring. Furthermore, particularly if the first support element comprises a reservoir, the additional machining of a recess is facilitated. The recesses preferably do not pass through the first support element.

Preferably, the first recesses comprise recesses in the cylindrical wall.

This can be in addition to or instead of the recesses in the first and, optionally, the second support element.

Preferably, the first recesses are bevels, fillets, channels or grooves.

Preferably, the first high-pressure recess, the first low-pressure recess, the first high-pressure conveying means and the first low-pressure conveying means are located on the first side of the ring.

This prevents the recesses from creating an imbalance. Furthermore, this simplifies the manufacture of the pump parts.

Preferably, the internal gear pump further comprises, located on the second side of the ring:
- a second high-pressure recess in an arc of a circle, in fluid contact with the cylindrical periphery of the ring on the first portion thereof and symmetrical to the second plane;
- a second low-pressure recess in an arc of a circle, in fluid contact with the cylindrical periphery of the ring on the second portion thereof and symmetrical to the second plane, the second high-pressure recess and the second low-pressure recess being separated;
- a second high-pressure conveying means forming a fluid connection between the high-pressure space and the second high-pressure recess; and
- a second low-pressure conveying means forming a fluid connection between the low-pressure space and the second low-pressure recess.

The presence of the second conveying means and second recesses allows better balancing of the axial forces and allows the radial thrust effect due to the recesses to be enhanced. The second high-pressure (or low-pressure) recess is symmetrical to the first high-pressure (or low-pressure) recess relative to the third plane.

Preferably, the first support element forms part of a pump casing and the second support element forms part of a pump cover.

This embodiment of the present disclosure allows the number of links in the chain of dimensions of the pump to be reduced. The casing and the cover can form a housing for the pump.

The present disclosure further proposes a turbine engine, for example an aircraft turbine engine, comprising an internal gear pump according to one of the embodiments of the present disclosure.

The present disclosure further proposes an aircraft comprising an internal gear pump according to one of the embodiments of the present disclosure.

DESCRIPTION OF THE DRAWINGS

Further features and advantages of the invention will become apparent upon reading the following detailed description, which is to be understood with reference to the accompanying drawings, in which:

FIG. 7a is a perspective view of the top of the first support element according to the second alternative embodiment of the present disclosure;

FIG. 7b is a perspective view of the bottom of the cylindrical wall according to the second alternative embodiment of the present disclosure; and FIG. 8 is a representation of the radial pressure exerted on the cylindrical periphery of the ring in a pump according to the preferred embodiment of the present disclosure.

DETAILED DESCRIPTION

Figure 1:
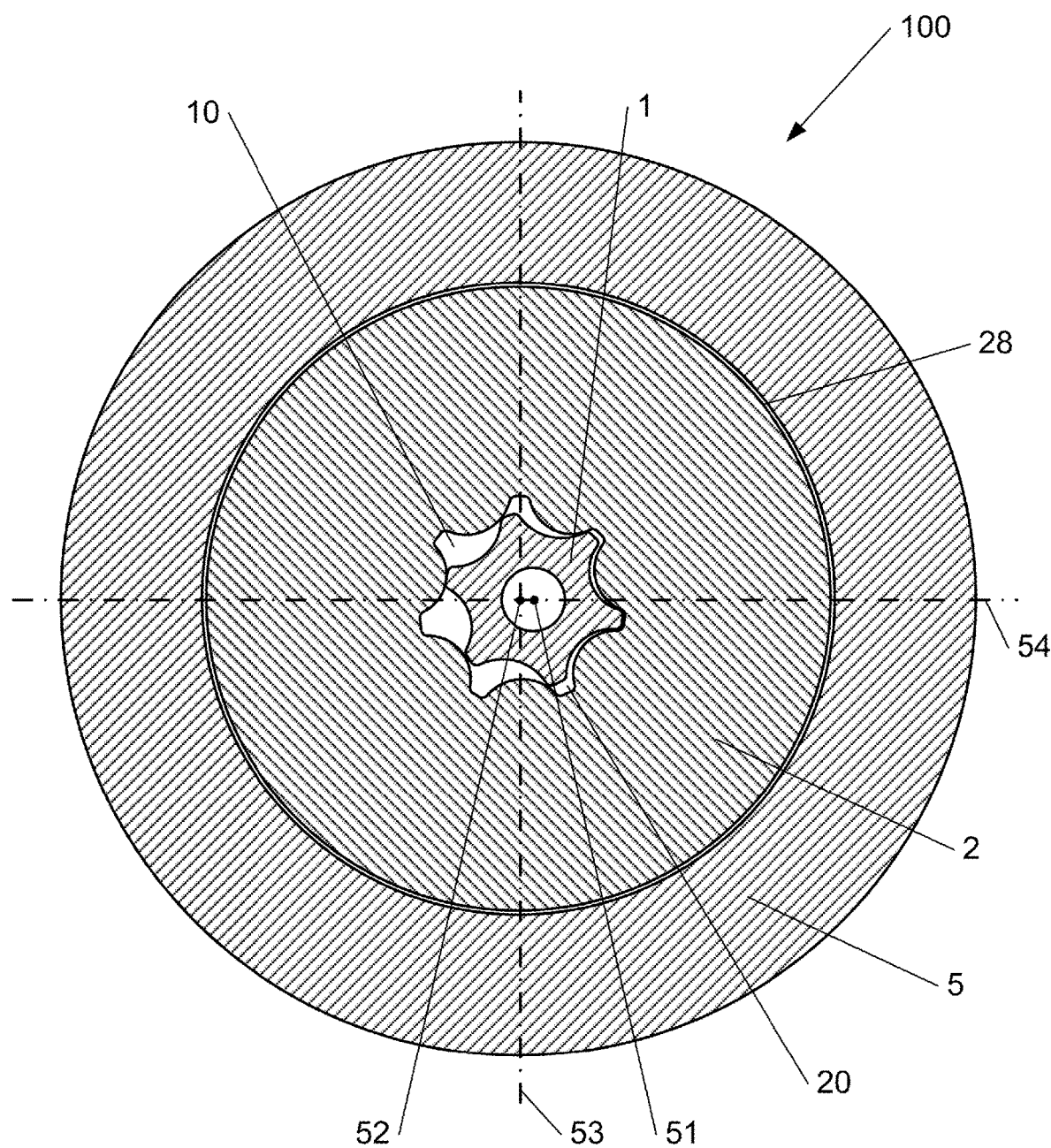
FIG. 1 is a horizontal sectional view of an internal gear pump according to one embodiment of the present disclosure.

The present invention is described with particular embodiments and with reference to figures; however, the invention is not limited thereto. The described drawings or figures are only schematic and are not limiting.

In the context of this document, the terms "first" and "second" are only used to differentiate the various elements and do not imply an order between these elements.

Throughout the drawings, identical or similar elements can have the same reference numerals.

FIG. 1 is a horizontal sectional view of an internal gear pump 100 according to one embodiment of the invention. The pump 100 comprises a pinion 1 having a first axis of rotation 51 and a ring 2 having a second axis of rotation 52. The first 51 and second 52 axes of rotation are different to each other and are parallel to each other. The plane passing through the first 51 and second 52 axes of rotation is referred to as the first plane 54. The plane perpendicular to the first plane 54 and passing through the second axis of rotation 52 is referred to as the second plane 53.

The ring 2 has a cylindrical periphery 28, which is surrounded by a cylindrical wall 5. The cylindrical wall 5 is an element having a cylindrical inner surface and for which the outer surface can be of any shape, for example cylindrical or a polygonal section. The cylindrical wall 5 supports the ring 2 in any orientation that is perpendicular to the second axis of rotation 52.

The ring 2 has a central hollow, in which the pinion 1 is located. The surface of this hollow has indented teeth. The pinion 1 has projecting teeth that are intended to be inserted into the indented teeth of the ring 2. The space between the ring 2 and the pinion 1 is a pump work space that includes a high-pressure space 10 and a low-pressure space 20. The high-pressure space 10 and the low-pressure space 20 are theoretically separated by the first plane 54.

Figure 2:
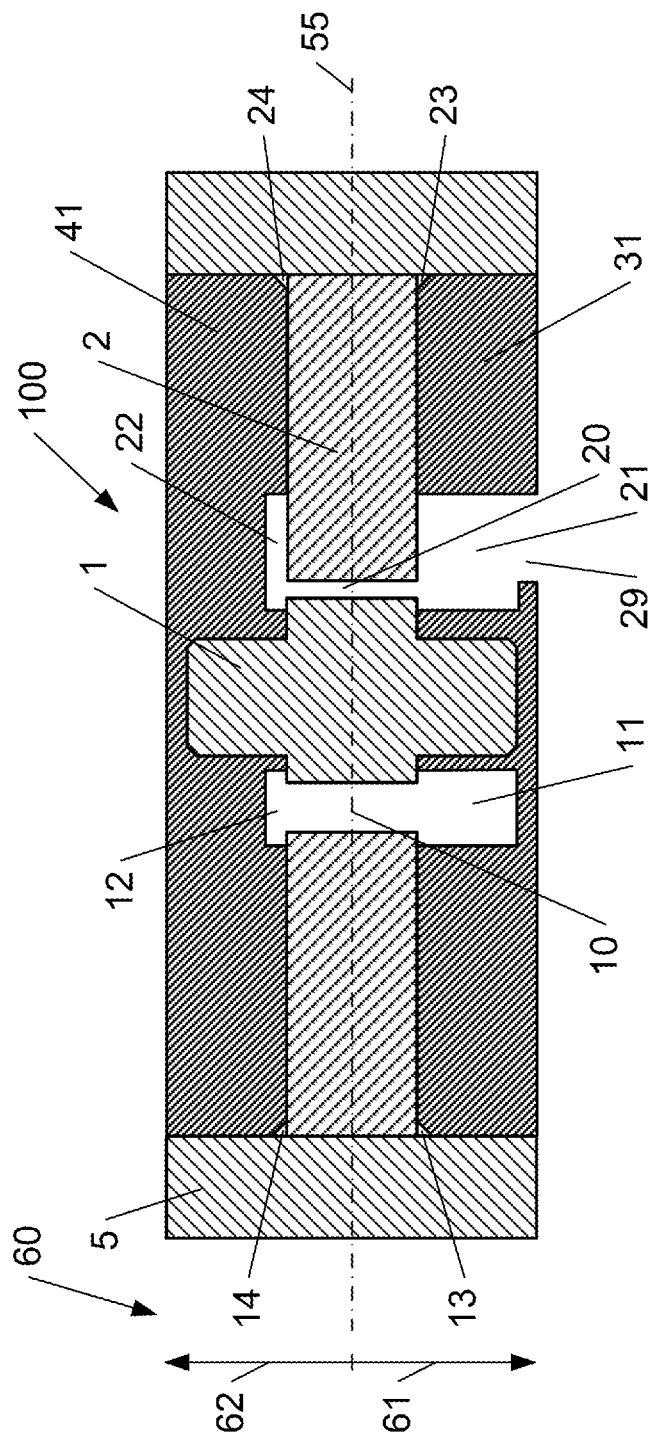
FIG. 2 is a vertical sectional view of a gear pump according to a preferred embodiment of the present disclosure.

FIG. 2 is a vertical sectional view of a gear pump 100 according to a preferred embodiment of the invention. A third plane 55, perpendicular to the first 54 and second 53 planes and passing through the centre of the ring 2, can be seen. The pump 100 comprises a first support element 31 arranged on a first side of the ring 2 and a second support element 41 arranged on a second side of the ring 2. The support elements 31, 41 allow the movement of the ring 2 and the pinion 1 to be limited in the two senses 61, 62 in an orientation 60 parallel to the first 51 and second 52 axes of rotation.

In the plane of the sectional view that can be seen in FIG. 2, the low-pressure space 20 is limited on the first side by a first low-pressure reservoir 21 forming part of the first support element 31 and on the second side by a second low-pressure reservoir 22 forming part of the second support element 41. The first low-pressure reservoir 21 comprises a duct 29 for introducing liquid into the pump. The inlet duct 29 can form part of the second low-pressure reservoir 22.

In the plane of the sectional view that can be seen in FIG. 2, the high-pressure space 10 is limited on the first side by a first high-pressure reservoir 11 forming part of the first support element 31 and on the second side by a second high-pressure reservoir 12 forming part of the second support element 41. The first high-pressure reservoir 11 comprises a duct 19 for discharging liquid from the pump, which is located in a plane other than that which can be seen in FIG. 2. The outlet duct 19 can form part of the second high-pressure reservoir 12.

In the preferred embodiment of the invention, the pump 100 comprises recesses 13, 14, 23, 24 in the form of bevels in the first 31 and second 41 support elements. The first recesses 13, 23 are located at an interface between the first support element 31, the cylindrical wall 5 and a first edge of the cylindrical periphery 28 of the ring 2, so as to be in fluid communication with the cylindrical periphery 28. The second recesses 14, 24 are located at an interface between the second support element 41, the cylindrical wall 5 and a second edge of the cylindrical periphery 28 of the ring 2, so as to be in fluid communication with the cylindrical periphery 28.

Figure 3:
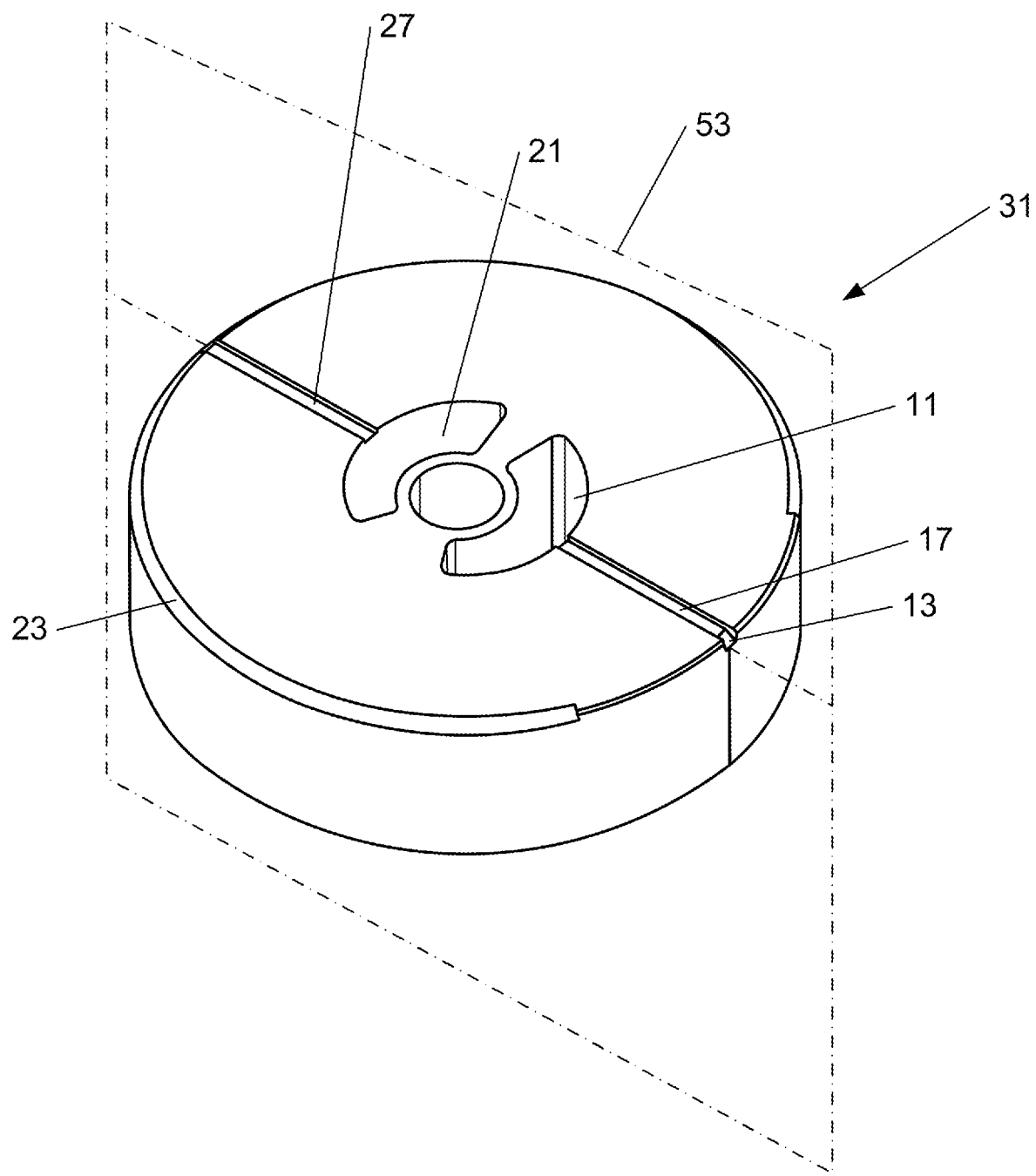
FIG. 3 is a perspective view of the top of the first support element according to the preferred embodiment of the present disclosure.

FIG. 3 is a perspective view of the top of the first support element 31 according to the preferred embodiment of the invention.

In this embodiment of the invention, the first support element 31 comprises a first high-pressure radial groove 17 and a first low-pressure radial groove 27, which are in the second plane 53 and are arranged against the ring 2. The first high-pressure recess 13 communicates with the high-pressure space 10 by virtue of a first high-pressure conveying means, which comprises the first high-pressure reservoir 11 and the first high-pressure radial groove 17. The first low-pressure recess 23 communicates with the low-pressure space 20 by virtue of a first low-pressure conveying means, which comprises the first low-pressure reservoir 21 and the first low-pressure radial groove 27.

The first high-pressure recess 13 is an arc of a circle and is symmetrical to the second plane 53. The first low-pressure recess 23 is an arc of a circle and is symmetrical to the second plane 53. The first high-pressure recess 13 and the first low-pressure recess 23 do not touch each other.

Preferably, the first low-pressure recess 23 has a greater angular extension than the first high-pressure recess 13. The first low-pressure recess 23 can have an angular extension of greater than 90°, more preferably of greater than 180°. The first high-pressure recess 13 can have an angular extension of less than 20°, more preferably of less than 10°.

In the preferred embodiment of the invention, the first low-pressure recess 23 is partially on the same side of the first plane 54 as the low-pressure space 20 and partially on the other side. The first high-pressure recess 13 is entirely on the same side of the first plane 54 as the high-pressure space 10.

In the preferred embodiment of the invention, the second support element 41 comprises second grooves and second recesses that are symmetrical to the first grooves and first recesses relative to the third plane 55.

Figure 4:
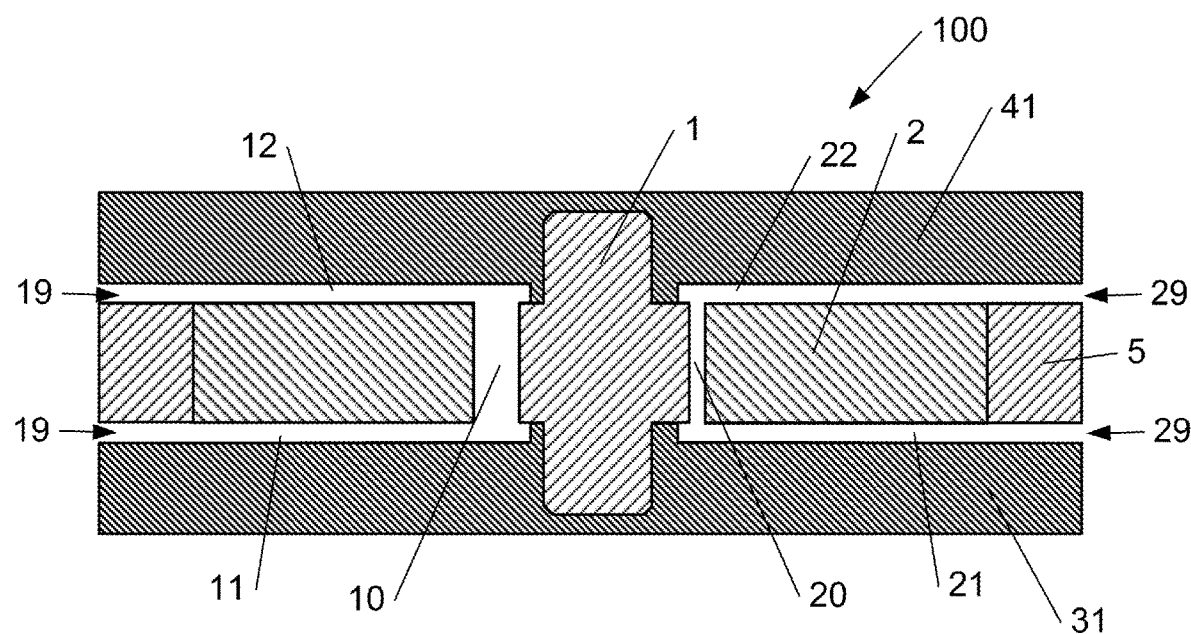
FIG. 4 is a vertical sectional view of a gear pump according to a first alternative embodiment of the present disclosure.
Figure 5:
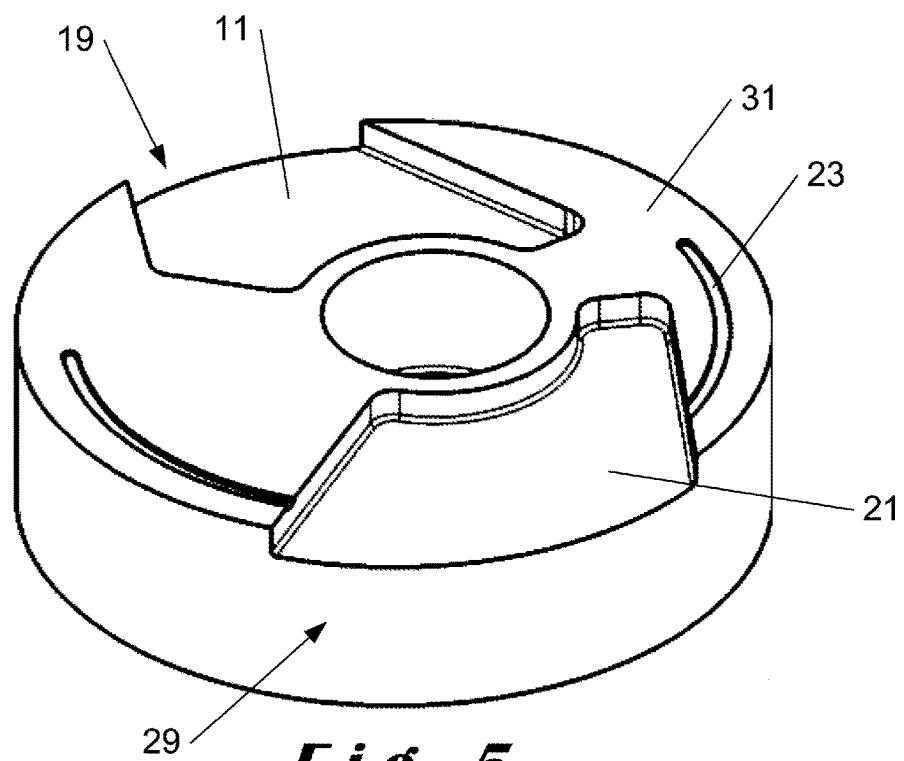
FIG. 5 is a perspective view of the top of the first support element according to the first alternative embodiment of the present disclosure.

FIG. 4 is a vertical sectional view of a gear pump 100 according to a first alternative embodiment of the invention. FIG. 5 is a perspective view of the top of the first support element 31 according to the first alternative embodiment of the invention. The first and second high-pressure 11, 12 and low-pressure 21, 22 reservoirs extend axially beyond the cylindrical periphery 28 of the ring 2, above and below the cylindrical wall 5. The first and second low-pressure reservoirs 21, 22 act as pump inlet ducts 29 and the first and second high-pressure reservoirs 11, 12 act as pump outlet ducts 19.

In the first alternative embodiment of the invention, the first and second low-pressure reservoirs 21, 22 form both the first and second low-pressure conveying means and, in part, the first 23 and second 24 low-pressure recesses. The first 23 (or second 24) low-pressure recess further comprises a groove in an arc of a circle in the first 31 (or second 41) support element that is arranged so as to be in contact with a first (or second) edge of the cylindrical periphery 28. The first 11 and second 12 high-pressure reservoirs form both the first and second high-pressure conveying means and the first 13 and second 14 high-pressure recesses.

Figure 6:
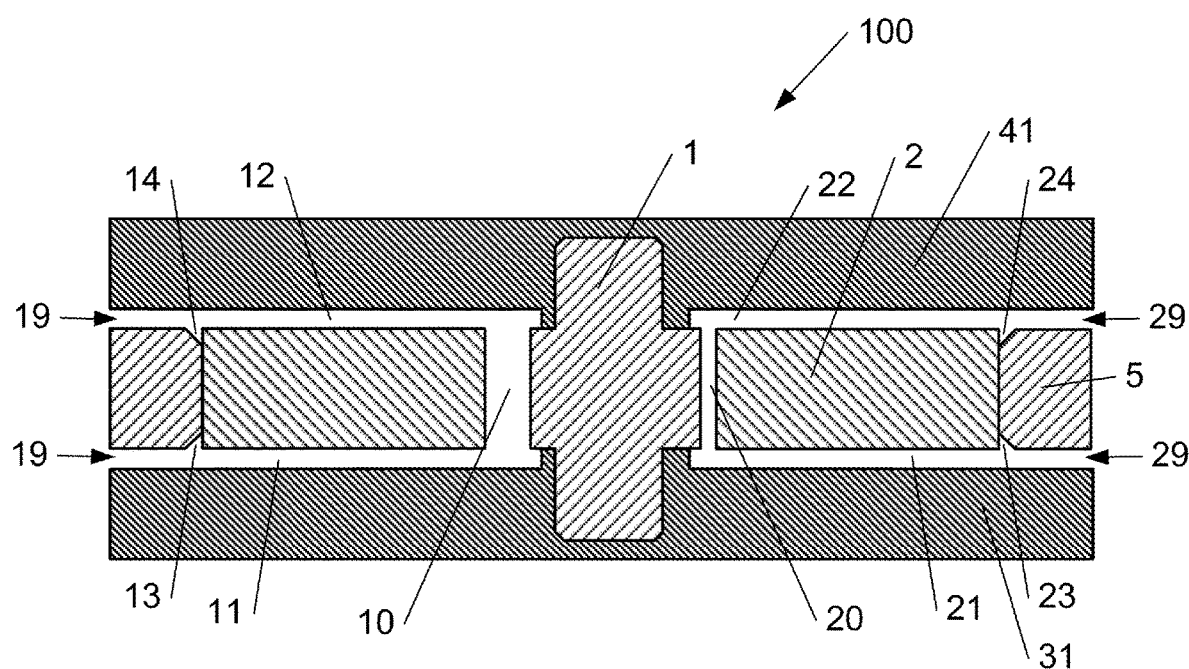
FIG. 6 is a vertical sectional view of a gear pump according to a second alternative embodiment of the present disclosure.

FIG. 6 is a vertical sectional view of a gear pump 100 according to a second alternative embodiment of the invention. FIG. 7a is a perspective view of the top of the first support element 31 according to the second alternative embodiment of the invention. FIG. 7b is a perspective view of the bottom of the cylindrical wall 5 according to the second alternative embodiment of the invention.

In the second alternative embodiment of the invention, the first and second high and low-pressure reservoirs 11, 12, 21 and 22 extend axially beyond the cylindrical periphery 28 of the ring 2, above and below the cylindrical wall 5. The first and second low-pressure reservoirs 21, 22 act as pump inlet ducts 29 and the first and second high-pressure reservoirs 11, 12 act as pump outlet ducts 19.

In the second alternative embodiment of the invention, the first 21 and second 22 low-pressure reservoirs form both the first and second low-pressure conveying means and, in part, the first 23 and second 24 low-pressure recesses. The first 23 (or second 24) low-pressure recess further comprises a bevel in an arc of a circle in the cylindrical wall 5, which bevel is in contact with a first (or second) edge of the cylindrical periphery 28.

In the second alternative embodiment of the invention, the first 11 and second 12 high-pressure reservoirs form both the first and second high-pressure conveying means and, in part, the first 13 and second 14 high-pressure recesses. The first 13 (or second 14) high-pressure recess further comprises a bevel in an arc of a circle in the cylindrical wall 5, which bevel is in contact with the first (or second) edge of the cylindrical periphery 28.

In one embodiment of the invention, the pump 100 comprises a casing comprising the first support element 31 and a cover comprising the second support element 41, or vice versa.

The features of the alternative embodiments of the invention can potentially be combined, particularly the features that differentiate these alternative embodiments from the preferred embodiment of the invention. For example, it is possible to combine the magnets 8 and the coil 6 of the third alternative embodiment of the invention with the first 31 and second 41 support elements of the first or second alternative embodiment of the invention.

FIG. 8 is a representation of the radial pressure exerted on the cylindrical periphery 28 of the ring 2 in a pump 100 according to a preferred embodiment of the invention. The representation of the ring 2 is located around the representation of the pinion 1. The representation of the cylindrical periphery 28 comprises dashed portions that correspond to the position of the representation of the first low-pressure recess 23 and to the position of the representation of the first high-pressure recess 13. The portion of the cylindrical periphery 28 shown in solid lines represents the gap between the first low-pressure recess 23 and the first high-pressure recess 13. The space between the representations of the ring 2 and the pinion 1 comprises the representation of the high-pressure space 10 and the representation of the low-pressure space 20.

The external radial pressure at any point of the ring 2 is represented by the distance between the representation of the cylindrical periphery 28 and a curve 200. The curve 200 has been digitally computed by the inventors. The radial pressure is constant and relatively large over the entire portion of the cylindrical periphery 28 that is in direct contact with the first high-pressure recess 13, i.e. on the first portion of the cylindrical periphery 28. The radial pressure is constant and relatively low over the entire portion of the cylindrical periphery 28 that is in direct contact with the first low-pressure recess 23, i.e. on the second portion of the cylindrical periphery 28. The radial pressure varies in a linear manner on the portion of the cylindrical periphery 28 that is not in direct contact with a recess.

In other words, the invention relates to an internal gear pump 100. The pump 100 comprises a pinion 1, a ring 2 arranged around the pinion 1 and a cylindrical wall 5 arranged around the ring 2. A support element 31, on which the pinion 1 and the ring 2 are supported, comprises means 11, 17 for carrying high-pressure liquid towards a recess 13 located at the junction between the ring 2 and the cylindrical wall 5, and means 21, 27 for carrying low-pressure liquid towards another recess 23 located at another point of the junction between the ring 2 and the cylindrical wall 5. The recess 13 allows the load of the ring 2 on the cylindrical wall 5 to be reduced.

The present disclosure has been described with respect to specific embodiments, which have a purely illustrative value and should not be considered to be limiting. In general, the present disclosure is not limited to the examples shown and/or described above. The use of the verbs "include", "comprise" or any other variant, as well as the conjugations thereof, can by no means exclude the presence of elements other than those mentioned. The use of the indefinite article "a", "an" or of the definite article "the" to introduce an element does not exclude the presence of a plurality of these elements. The reference numerals in the claims do not limit the scope thereof.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. An internal gear pump comprising:
   a pinion capable of rotating about a first axis of rotation;
   a ring arranged around the pinion, having a cylindrical periphery and being configured to rotate about a second axis of rotation that is different to the first axis of rotation and parallel thereto, the pinion and the ring being arranged to delimit a work space comprising a high-pressure space and a low-pressure space;
   a first support element arranged on a first side of the ring to limit the movement thereof in a first sense along a first orientation that is substantially parallel to the first and second axes of rotation;
   a second support element arranged on a second side of the ring to limit the movement thereof in a second sense that is opposite the first sense and in the first orientation;
   a cylindrical wall arranged around the ring to limit the movement thereof in a plane that is substantially perpendicular to the second axis of rotation;
   a first high-pressure recess in an arc of a circle and in fluid contact with a first portion of the cylindrical periphery of the ring;
   a first low-pressure recess in an arc of a circle and in fluid contact with a second portion of the cylindrical periphery of the ring, the first high-pressure recess and the first low-pressure recess being separated;
   a first high-pressure conveying means forming a fluid connection between the high-pressure space and the first high-pressure recess; and
   a first low-pressure conveying means forming a fluid connection between the low-pressure space and the first low-pressure recess,
   wherein the first high-pressure recess is symmetrical to a second plane passing through the second axis of rotation and perpendicular to a first plane passing through the first and second axes of rotation, and the first low-pressure recess is symmetrical to said second plane, wherein the first low-pressure recess has a larger angular extension than the first high-pressure recess.

2. The internal gear pump according to claim 1, wherein the angular extension of the first low-pressure recess is greater than 90°, preferably greater than 180°.

3. The internal gear pump according to claim 1, wherein the first high-pressure recess is at least partially, preferably entirely, on the same side of the first plane as the high-pressure space, and the first low-pressure recess is at least partially on the same side of the first plane as the low-pressure space.

4. The internal gear pump according to claim 1, wherein the first high-pressure conveying means comprises a first high-pressure reservoir in the first support element, and the first low-pressure conveying means comprises a first low-pressure reservoir in the first support element.

5. The internal gear pump according to claim 4, wherein the first high-pressure reservoir comprises a portion passing through the first support element and forming part of a duct for discharging liquid from the pump, and the first low-pressure reservoir comprises a portion passing through the first support element and forming part of a duct configured to introduce liquid into the pump.

6. The internal gear pump according to claim 1, wherein the first high-pressure recess, the first low-pressure recess, the first high-pressure conveying means and the first low-pressure conveying means are located on the first side of the ring.

7. The internal gear pump according to claim 6, further comprising, located on the second side of the ring:

a second high-pressure recess in an arc of a circle, in fluid contact with the cylindrical periphery of the ring on the first portion thereof and symmetrical to the second plane;

a second low-pressure recess in an arc of a circle, in fluid contact with the cylindrical periphery of the ring on the second portion thereof and symmetrical to the second plane, the second high-pressure recess and the second low-pressure recess being separated;

a second high-pressure conveying means forming a fluid connection between the high-pressure space and the second high-pressure recess; and a second low-pressure conveying means forming a fluid connection between the low-pressure space and the second low-pressure recess.

8. A turbine engine comprising an internal gear pump according to claim 1.

9. An aircraft comprising an internal gear pump according to claim 1.

\* \* \* \* \*